US009038274B2

(12) United States Patent
Koivunen (10) Patent No.: US 9,038,274 B2
(45) Date of Patent: May 26, 2015

(54) METHOD OF MAKING CONCRETE PILE SECTIONS (71) Applicant: Sun Piledriving Equipment, LLC, Frankford, DE (US)

(72) Inventor: Kari Koivunen, Panelia (FI)

(73) Assignee: SMRF, LLC, Frankford, DE (US)

( * ) Notice: Subject to any disclaimer, the term of this patent is extended or adjusted under 35 U.S.C. 154(b) by 0 days.

(21) Appl. No.: 14/190,847

(22) Filed: Feb. 26, 2014

(65) Prior Publication Data

US 2014/0241816 A1   Aug. 28, 2014

Related U.S. Application Data (62) Division of application No. 12/100,788, filed on Apr. 10, 2008.

(60) Provisional application No. 60/907,710, filed on Apr. 13, 2007.

(51) Int. Cl.
*E02D 5/38* (2006.01)
*E02D 5/52* (2006.01)
*E04C 3/34* (2006.01)

(52) U.S. Cl.
CPC *E02D 5/38* (2013.01); *E02D 5/523* (2013.01); *E04C 3/34* (2013.01)

(58) Field of Classification Search
CPC ........... E02D 5/30; E02D 5/523; E02D 5/526; E02D 11/00; E02D 15/02; E02D 15/04
See application file for complete search history.

(56) References Cited

U.S. PATENT DOCUMENTS

| | | | |
|---|---|---|---|
| 1,073,614 A * | 9/1913 | McDearmid ................. | 405/251 |
| 3,313,560 A | 4/1967 | Macchi | |
| 3,504,500 A * | 4/1970 | Fristedt ...................... | 405/252 |
| 3,884,589 A | 5/1975 | Liedholm et al. | |
| 3,930,373 A * | 1/1976 | Wahman ..................... | 405/252 |
| 4,362,416 A * | 12/1982 | Kaimo ........................ | 403/316 |
| 4,362,417 A * | 12/1982 | Vesa et al. .................. | 403/317 |
| 4,605,340 A * | 8/1986 | Stephan ...................... | 405/252 |
| 6,735,912 B2 | 5/2004 | Riggio | |

FOREIGN PATENT DOCUMENTS

EP    0573505    12/1993

\* cited by examiner

*Primary Examiner* — Alexander P Taousakis
(74) *Attorney, Agent, or Firm* — Blank Rome LLP (57) ABSTRACT

A casting guide and a method of making a concrete pile using the casting guide, the casting guide including a casting guide end plate, at least two lock rod forms including a first set of crosswise through-holes, and at least two lock socket forms including a second set of crosswise through-holes. The first and second sets of crosswise through-holes configured to removably receive a casting guide pin extending substantially across the casting guide end plate and interconnecting the crosswise through-holes the lock rod forms or lock socket forms when the casting guide is inside a casting chute.

14 Claims, 9 Drawing Sheets

METHOD OF MAKING CONCRETE PILE SECTIONS

CROSS-REFERENCE TO RELATED APPLICATIONS

The present application is a Divisional of U.S. Ser. No. 12/100,788 filed Apr. 10, 2008 and is related to and claims priority to application Ser. No. 60/907,710, entitled "JOINT FOR REINFORCED CONCRETE PILE SECTIONS," filed on Apr. 13, 2007, the contents of which are incorporated herein in their entirety.

BACKGROUND OF THE INVENTION

1. Field of the Invention

The present invention relates to joints for concrete piles, methods for making concrete pile joints, and methods for joining concrete piles using those joints.

2. Description of Related Art

The most common pile used in many parts of the world, such as in Scandinavian countries, is the pre-cast reinforced concrete pile. Because of manufacturing, structural, transportation, installation, and other limitations associated with concrete piles, the length of the piles is often limited to a predetermined length. Depending on the situation, it is often necessary to join, or splice, two piles end-to-end at a construction site when an individual pile section is not long enough for a particular application. However, joining discrete concrete piles presents several difficult challenges, such as proper alignment of the pile sections, maintaining continuity of strength, mechanical performance, and other properties. Alignment is critical to prevent slippage, bending stresses, and other problems associated with pile splices.

A concern that is often associated with the use of mechanical splices for piles is the ability of the splice to transmit stress waves of the impact hammer from the upper segment of the pile to the lower segment. A splice with inadequate transmissivity of stress waves would hinder the ability to test the pile for integrity and capacity using the Pile Driving Analyzer (PDA), which is a widely used pile-testing tool in the United States.

A number of solutions have been proposed for splicing reinforced concrete piles. A common method of splicing piles is to provide the ends of the piles to be joined together with four longitudinal locator and locking pins with crosswise holes or grooves that are inserted into the corresponding recesses in the opposing pile ends after the piles have been placed on top of each other in order to be spliced. The pile splice is locked in position by driving locking pins or keys from the side through the crosswise holes or grooves positioned at the corresponding positions at the pile ends. This method of joining piles together has, however, proved to be complicated to manufacture, and it is difficult to make it fit accurately because of the variations in the dimensions of the joint end plates that cover the ends of the piles.

Additionally, a problem with all known pile splices is how to position the joint squarely on top of the pile in connection with casting because they can only be locked to the concrete casting chute at two corners (i.e., the top corners that are visible and accessible). This type of splice varies in detail. However, they all exhibit numerous drawbacks. First, the structure of known joints is complicated, expensive to manufacture and unreliable in service. Second, both the female lock socket and male lock rod must be made of solid steel by machining, which results in considerable wastage of raw material and makes the final product heavy and expensive. Additionally, the lock socket is a closed construction easily penetrated by water, which then freezes at sub-zero temperatures, meaning that pile splicing cannot be carried out under certain conditions. The removal of ice is highly complicated in pile-driving conditions at a construction site. Because of those problems, attempts have also been made to develop a range of joints for splicing reinforced concrete piles together.

U.S. Pat. No. 3,884,589 discloses an exemplary locking joint for concrete piles having joined sections. The facing end surfaces of the sections to be joined are made of metal and have outwardly projecting pins and/or openings arranged therein, the openings communicating with the pin receiving spaces to receive the pin from a next pile section. The pin receiving spaces have metal walls and each pin has a transverse hole therethrough to receive a wedge device to be inserted through the hole in the pin through a bore projecting through the side of the pile section into which the pin is inserted, thereby to hold the ends of the pile sections in firm abutting relationship as previously described. The locking joint is mainly characterized in that the wedge device is held in locking position in the bore and in the transversally extending hole through the pin by locking means located in the bore adjacent the side surface of the pile section and on the wedge device itself.

U.S. Pat. No. 5,032,041 discloses a joining device for concrete piles having a "through-going cavity" (9) that traverses the width of the concrete pile and that allows one to insert a wedge (13) to secure two concrete pile ends together. As shown in FIG. 9 of that patent, the wedge can be easily reversed by driving it back out of the key hole.

U.S. Pat. No. 4,009,550 discloses a concrete pile joint box that is square- or box-shaped, illustrating what many concrete pile joints look like today.

U.S. Pat. No. 3,313,560 discloses a pre-tensioning wire anchoring system for concrete pre-compressed structures (concrete pipes are illustrated), and teaches using a flat socket member adapted to being placed at the end of a concrete form, the socket member having multiple spaced-apart through holes for insertion of a tensioning wire.

EP 1,288,382 discloses a joint for joining reinforced concrete pillars together, and requires that the projecting locking part have an annular groove, a connecting element that includes an annular groove, and a spring-like locking element which locks in the two grooves.

Prior art concrete piles use concrete anchor bars to provide a means to attach and/or align joints. However, anchor bars of that type are not suitable for precision component purposes.

It is not uncommon to observe wet, muddy, and icy conditions at construction sites where concrete piles are used. Because concrete piles are often placed directly on the ground before use at a site, the transverse holes for the locking pins often become clogged with debris, ice, mud, pebbles, etc. However, if a straight path is present to the other side, the debris can simply be pressed through. Ice is a particular concern for concrete piles, as mentioned above, because the spliced sections often become unstable. Therefore, pin-receiving tubes that extend straight through from one side of the pile to the other present a significant prevention in lost resources due to unusable or damages to concrete piles. The aforementioned prior art pile joints and methods of joining piles fail to address those, and other known problems associated with typical concrete piles.

BRIEF SUMMARY OF THE INVENTION

In view of the lack of suitable solutions to the aforementioned problems offered in the prior art, it should be apparent that there exists a need for a concrete pile joint that can be manufactured to high tolerance levels (preferably achieved through use of robotic manufacturing) at minimum cost that, when used to splice concrete pile sections, produces a highly reliable splice. The purpose of the present invention is to provide a simpler stiff pile splice for use in reinforced concrete piles by eliminating the drawbacks exhibited by known similar splices. More specifically, the invention seeks to provide a stiff pile splice with low cost of materials and labor in production.

Another purpose of the invention is to provide a pile splice with a locking system that is not loosened even by a large number of impacts.

An object of the invention is to provide a pile splicing solution to which locking structures may be threaded or welded, and to provide a locking joint that can be fixed to a concrete casting chute at all the four corners thanks to parallel crosswise holes extending all the way across the structure.

Another object of the invention is to provide a joint that allows for superior alignment of piles and multiple splicing scenarios for higher chance of success in driving piles.

Another object of the invention is to use robotic welding and machining equipment to ensure very tight tolerances so that splices are very tight at the joints.

Another object of the invention is to provide a splice with four corners of equal stress, because such a design results in excellent alignment of the pile sections. If the stress is uneven, then one could observe deflection between pile sections. If the splice is loose (not tight as compared to installation conditions), then it would "clutter" during installation (i.e., pile hammering). If splice is separated and if impacted, this would increase the risk that the pile will break. Also, without the excellent alignment provided by the present design, the pins can come loose or fall out altogether.

Briefly described, those and other objects and features of the present invention are accomplished, as embodied and fully described herein, by a joint for a concrete pile section having a first end plate for connecting to the concrete pile; a plurality of spaced apart lock rods attached to and extending substantially perpendicular to the first end plate; a plurality of spaced apart lock sockets attached to and extending substantially perpendicular to the first end plate, wherein each of the plurality of lock sockets has a cavity portion and axially-aligned crosswise through-holes on opposite walls of the cavity; and at least one pin-receiving member interconnected between the crosswise through-holes of at least two of the plurality of lock sockets, wherein the member extends substantially across the first end plate.

The joint includes a pin-receiving member that extends a distance into one of the crosswise through-holes. The pin-receiving member includes a first pin-receiving portion extending from a first peripheral edge of the first end plate into one of the crosswise through-holes; a second pin-receiving portion extending between two crosswise through-holes and substantially axially-aligned with the first pin-receiving portion; and a third pin-receiving portion extending from a second peripheral edge of the first end plate into one of the crosswise through-holes and substantially axially-aligned with the first and second pin-receiving portions.

The joint may further include a step edge formed circumferentially at the insertion opening of the at least two lock sockets where they attach to the first end plate. An anchoring device may be attached to at least one of the plurality of lock rods and at least one of the plurality of lock sockets, wherein the at least one anchoring device extends substantially perpendicular to the first end plate. The plurality of lock rods are preferably conical shaped. The plurality of lock rods includes an annular groove at a portion where the lock rods attach to the first end plate. A protective cap may be inserted into the cavity of the plurality of lock sockets. Another protective cap may be inserted into an end of the pin-receiving member. A protrusion may be attached to the protective cap for inserting into a recess.

Briefly described, the objects and features of the present invention are also accomplished, as embodied and fully described herein, by a method for making a joint for a concrete pile, which includes the steps of: attaching to a first end plate a plurality of spaced apart lock rods extending substantially perpendicular to the end plate; attaching to the first end plate a plurality of spaced apart lock sockets extending substantially perpendicular to the first end plate, wherein each of the plurality of lock sockets has a cavity portion and axially-aligned crosswise through-holes on opposite walls of the cavity; attaching at least one pin-receiving member to the first end plate, wherein the pin-receiving member interconnects the crosswise through-holes of at least two of the plurality of lock sockets, and wherein the member extends substantially across the first end plate. The method further includes attaching the joint to a concrete pile, and splicing the pile joint with another pile joint by removably inserting a locking pin into the pin-receiving member, crimping an end of the pin-receiving member to secure the locking pin.

The concrete pile to which the joint is attached preferably includes a square base. The connecting ends of driven reinforced concrete piles feature box-like or plate-like parts to which the locking structures are attached by welding using robotic welding machines. This allows the splice to withstand forces acting on it from all directions. The tight tolerances are provided by precision machining and robotically welding components together.

In a concrete pile splice according to the present invention, the locking parts are provided with a suitable crosswise tube to permit the locking pin being driven into the tube-like tunnel of the locking joint to press the lock rod and lock socket firmly against each other; the lock sockets are interconnected with tube-like parts; the locking pin is round in cross-section; and the locking pin is capable of being driven into the tube-like tunnel from the side. The locking pin is preferably beveled at the tip, so that the small diameter at the tip starts insertion, and when fully inserted, the pin is in a double shear plane arrangement. It takes up to seven tons of jack pressure to remove the fully inserted pin. This type of splice is desirable and necessary in some application where, for example, five 50-ft piles are joined together and driven into soft material to form a footing.

By design, the dimensional characteristics of the present splice is such that the locking pins cause positive compression at the joint, which uniquely improves both the magnitude of the contact surface area and the degree of tightness of the contact area of the upper and lower pile segments. The results of PDA tests performed on piles joined with the present splice did not show warning signs that would be expected in the case of discontinuous piles. The presence of the splice was not discernable on the resultant force and velocity wave traces, which are typically displayed on the PDA computer screen during testing. However, further scrutiny of the measurements showed that when the force waves were broken up into upward-moving and downward-moving components, the presence of the splice was evident in the upward-moving wave component only. The magnitude of the effect of the presence of the splice on the wave trace was within the range of those observed for typical anomalies for similar piles.

The PDA Integrity Factor ($\beta$) of piles using the present invention was 100 percent. Generally, the $\beta$ value of less than 80 percent would raise concern for potential lack of continuity (breakage) of a pile. A broken pile would have β values of significantly less than 80 percent. Correctly so, piles using the subject splice approached the state of continuum by virtue of the positive compression the joint afforded by the tight design of the locking pins, and as a result demonstrated β values of 100 percent.

The Case pile Wave Analysis Program (CAPWAP) evaluations of PDA records obtained on piles using the present invention provided near-perfect match of the measured and computed force curves, with reasonably good Match Quality of less than 3.0. Noteworthy, it is nearly impossible to perform a successful CAPWAP evaluation on PDA data from a broken pile. The corroborative extent of the capacities of the spliced pile based on the two methods (PDA and CAPWAP), along with measured excellent energy transmission through the splice, demonstrates the ability of the subject splice to foster continuum behavior of spliced piles.

The splice in accordance with the present invention offers a number of additional benefits. Thanks to simple construction, substantial savings are achieved in the cost of materials and labor. As a result, a non-loosening locked splice is accomplished even after a large number of impacts. At the same time, this construction prevents the problems caused by water freezing in the lock socket on the pile-driving site when piles are spliced. Additionally, the invention provides a locked splice that does not have to be anchored in the end plate using load-bearing welds.

In one embodiment of the invention, the locking pin is round with no shoulders and conical in shape at both ends, so that the cross section is identical with that of the crosswise holes substantially in the locking parts; the tube-like parts in the splice form a crosswise tunnel in the pile that serve as a casting formwork and as an access route for the locking pin; the crosswise tubes in the splice are positioned in the lock rod in such a way that they pre-tension the splice as a result of the deflection of the locking pin. The round, shoulderless locking pin may be conical at one end only.

In a second embodiment of the invention, the first piece to be joined includes a reinforced concrete pile with the connecting device at its end consisting of a round protrusion with a round through-hole such that the other piece to be joined is a rock point with connection point compatible with the splicing parts in terms of cross section; the connecting parts of the reinforced concrete pile and the rock points are interlocked with a locking pin supported on the joint placed eccentrically at the distance required for pre-tensioning. The locking pin can also be locked later by bending the wall of pin-receiving tube to prevent it from being dislodged.

With those and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE INVENTION

Several preferred embodiments of the invention are described for illustrative purposes, it being understood that the invention may be embodied in other forms not specifically shown in the drawings.

Figure 1:
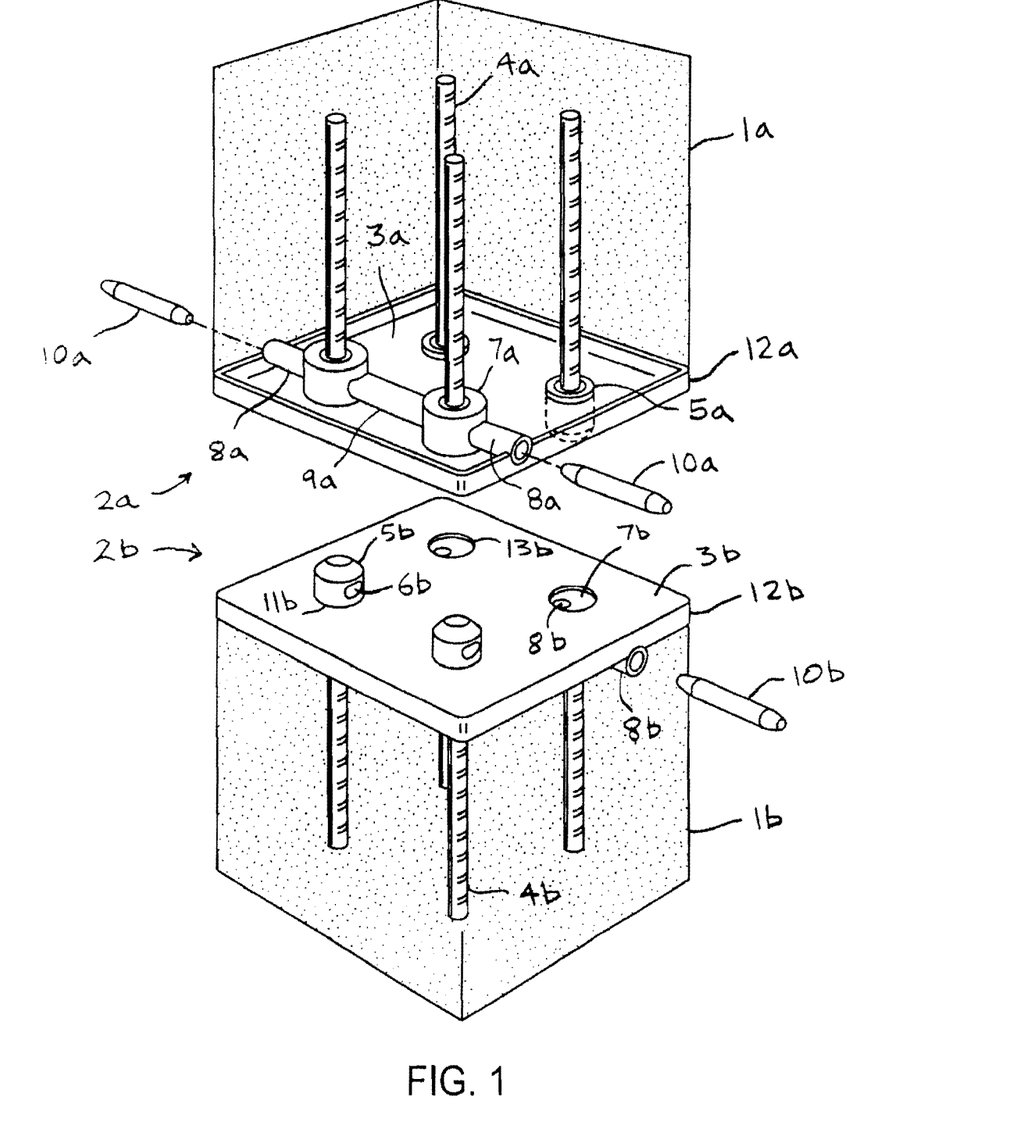
FIG. 1 is a schematic drawing showing an axonometric view of the splicing ends of two reinforced concrete piles each with a compatible joint according to the present invention.
Figure 14:
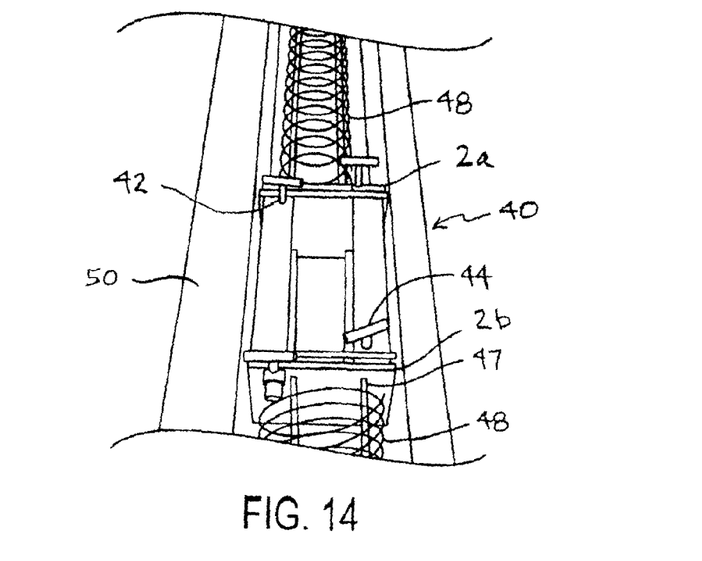
FIG. 14 is a schematic drawing showing a perspective view of the casting guide of FIG. 13 and joint according to the present invention positioned together inside a casting chute prior to a concrete pour.

Turning first to FIG. 1, shown therein is a schematic drawing of an axonometric view of the splicing ends of two reinforced concrete piles 1a, 1b each with a compatible joint according to the present invention. The two reinforced concrete piles 1a, 1b are to be joined together with the pile ends close to each other but still not touching. Piles 1a, 1b are primarily made of concrete, in addition to which they contain concrete reinforcement bars ("rebars") (as best seen in FIG. 14).

FIG. 1 shows the structure of the joints 2a, 2b of the reinforced concrete piles 1a, 1b in more detail. Each of the joints 2a, 2b includes an end plate 3a, 3b, respectively, which may or may not include edges 12a, 12b, as well as welded anchoring devices 4a, 4b, lock rods 5a, 5b, lock sockets 7a, 7b, peripheral locator tubes 8a, 8b, transverse locator tubes 9a, 9b, and locking pins 10a, 10b. The number of components shown in FIG. 1 is for illustrative purposes only. A typical joint will include two lock rods 5 and two lock sockets 7 spaced apart at the corners of the end plate 3.

As shown in FIG. 1, the joint 2a of the upper reinforced concrete pile 1a includes the end plate 3a featuring suitable holes 11a for the insertion of lock rods 5a and lock sockets 7a and forming, together with the edges 12a being slightly bent over, a box-like structure that is adapted to being positioned at the end of a rectangular or square concrete pile. The edges 12a may be created using a press, and are preferably about ⅜-inch in height around the entire periphery. They are non-structural components and are used for stiffness and casting. One of ordinary skill will appreciate that the end plates 3a, 3b of the present invention are not limited to being square- or box-shaped, but could encompass other shapes as well. Typical sizes for the end plate 3 are well known in the industry by those skilled in the art.

Fixed to the opposite sides (or corners) of the end plate 3a, are the lock sockets 7a, aligned with the holes 13a in the end plate 3a, while fixed to the opposite sides (or corners), are the lock rods 5a, each provided with a crosswise hole 6a in the protruding section. The inner surfaces of the protruding lock rods 5a extend through the end plate 3a to which the anchoring devices 4a are welded to provide bonding. In a preferred embodiment, the anchoring devices 4a are rebar.

The lock rods 7a are interconnected by the peripheral locator tubes 8a, and the transverse locator tube 9a. Similarly, the lock sockets 7b are interconnected by the peripheral locator tube 8b, and the transverse locator tube 9b welded to the joint 2b of the lower reinforced concrete pile 1b. The lock sockets 7b have a base to which the anchoring devices 4b (here, again, rebar) have been welded to provide bonding to the splice. The anchoring devices may be arranged in single pieces or multiple pieces. The lock rods 5b have been attached to the opposite sides (or corners) of the end plate 3b. The anchoring devices 4b are fixed to the lock rods 5b by welding or with threads.

The peripheral locator tubes 8a, and the transverse locator tube 9a, are generally coaxially aligned. The peripheral locator tubes 8b, and the transverse locator tube 9b, are also generally coaxially aligned.

Although not shown in FIG. 1, the lock rods 5a, 5b and lock sockets 7a, 7b can be placed on the same sides or at opposite corners of the respective end plates 3a, 3b.

As discussed previously, it is important to use economical materials in the manufacture of the joints 2a, 2b. To make the least expensive end plates 3a, 3b as possible, they are essentially a non-structural component of the joints 2a, 2b. Their main role is for alignment of the locking assemblies—the lock rods 5a, 5b, and lock sockets 7a, 7b. However, lower cost end plates 3a, 3b tend to have worse tolerances across the surface. The goal is to ensure adequate eccentricity of the two (male to female) peripheral locator tubes 8a, 8b and transverse locator tubes 9a, 9b so as to accept the locking pins 10a, 10b and pull the mating joints together. The present invention achieves that goal, and results in a splice that efficiently transmits energy along the entire length of the spliced concrete pile, such as during pile driving, without damaging the pile.

The lock sockets 7a, 7b are toleranced by the step edge that is lathed for purpose of fitting onto the end and into the end plates 3a, 3b. Because the lock sockets 7a, 7b pass through the end plates 3a, 3b, the lock sockets 7a, 7b can physically contact the male lock rods 5a, 5b. This simple nuance reduces the cumulative tolerance path that eventually affects the range of eccentricity of the crosswise holes 6a, 6b, and the peripheral and transverse locator tubes, 8a, 8b, 9a, 9b. It is preferable that offsetting the crosswise holes 6a, 6b relative to the peripheral and transverse locator tubes 8a, 8b, 9a, 9b provides about a few hundredths of an inch eccentric offset or more, preferably about 2 millimeters.

Moreover, the lock sockets 7a, 7b use the end plates 3a, 3b as a placement constraint as well. With this pass-through approach to the lock socket 7a, 7b part of the device made possible by the peripheral and transverse locator tubes 8a, 8b, 9a, 9b extending across the entire width of the end plates 3a, 3b, the device is capable of being manufactured to the same tolerance, i.e. not relying on quality of the end plates 3a, 3b, but on the quality of the process steps used to weld the lock sockets 7a, 7b, and lock rods 5a, 5b, to the end plates 3a, 3b.

Figure 2:
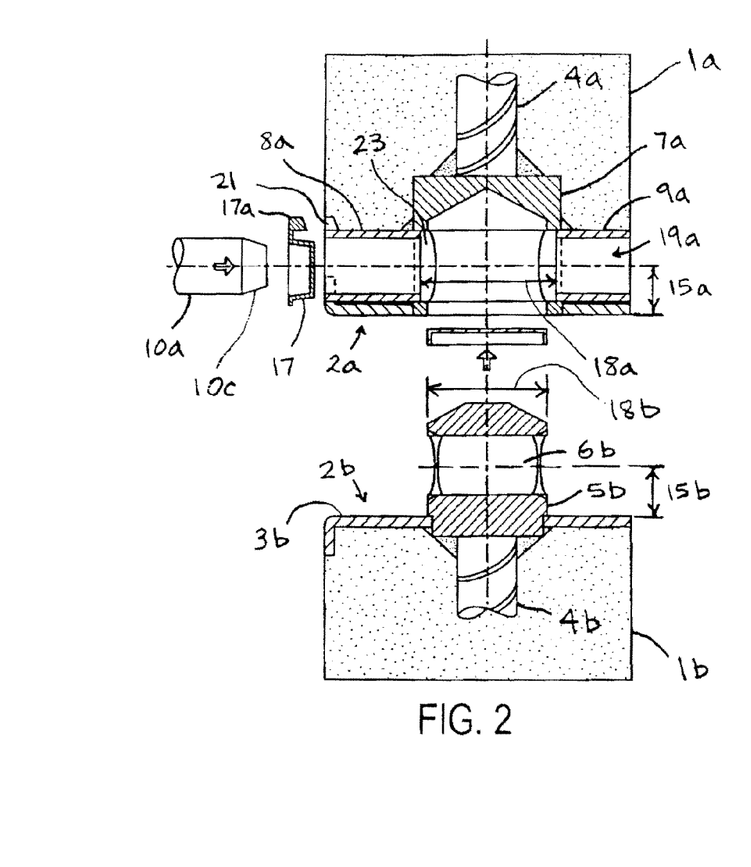
FIG. 2 is a schematic drawing showing a partial cross-sectional view of two compatible joints in a pre-connecting position according to the present invention.

Turning now to FIG. 2, shown therein is a schematic drawing of a partial cross-sectional view of two compatible joints 2a, 2b in a pre-connected or pre-spliced position according to the present invention. Extending through the end plate 3a, there is attached to the upper pile a lock socket 7a, to which the generally coaxially-aligned peripheral locator tube 8a and the transverse locator tube 9a are attached. Placed in the lock socket hole 23 of the lock socket 7a, the peripheral locator tube 8a and the transverse locator tube 9a provide a dimension 18a that is suitably greater than the dimension 18b, thereby providing the necessary pre-tensioning of the splice by the action of the deflection of the locking pin 10a when it is inserted into the peripheral locator tube 8a and the transverse locator tube 9a from the side of the pile 1a.

FIG. 2 also shows the relative dimensions of the joints 1a, 1b indicated by alphanumeric symbols 15a and 15b, which are measured from the adjoining surfaces of the respective piles 1a, 1b. FIG. 2 shows that the dimension 15a in the lock socket 7a, and the dimension 15b in the lock rod 5b, can be machined highly accurately to the required size in order to ensure adequate tightness of the splice. This provides optimum tightness because the dimension 15a, in a preferred embodiment of the invention, is a few tenths of a millimeter greater than the dimension 15b, forcing the locking pin 10a to deflect when it is inserted and the two piles are joined together, which creates a very tight splice that is difficult to detect using traditional dynamic pile testing techniques, as previously described. The dimensions 15a, 15b are important for the proper in-service performance of the lock socket 7a and the lock rod 5b. The actual dimensions 15a, 15b for specific applications can be ascertained by experimentation.

FIG. 2 also shows that the splicing half 2a of the upper pile 1a includes a protective cap 16 and a protective cap 17 to prevent the ingress of concrete into the locking means during casting. The protective cap 17 features a protrusion 17a, which makes it possible to bend the wall of the tube 8a so as to prevent the locking pin 10a from being dislodged when the pile 1a is driven into the ground.

The peripheral locator tube 8a and the transverse locator tube 9a form a crosswise tunnel 19a extending across the pile 1a. As a result, a casting tool may be used to position the joint 2a squarely perpendicular relative to the longitudinal direction of the pile 1a (i.e., no bending along the length of the end plate 3a). Additionally, FIG. 2 shows that the lock rod 5b contains a groove 14 sized to the dimension 15b from the centre line of the crosswise hole 6b.

Figure 3:
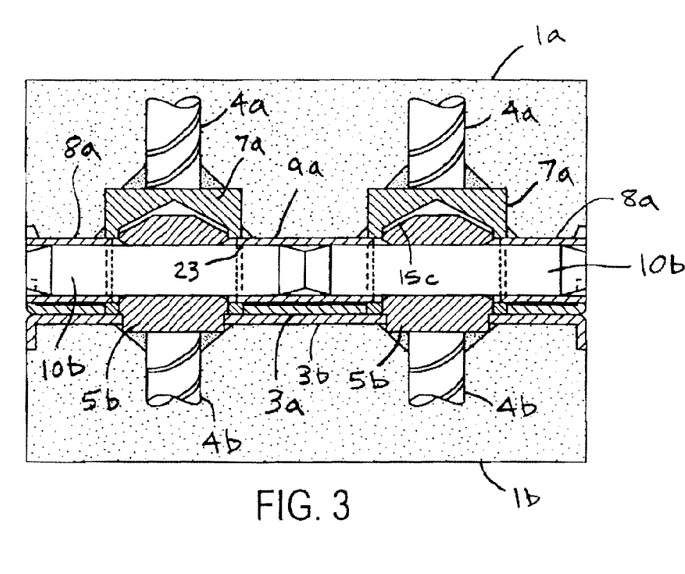
FIG. 3 is a schematic drawing showing a partial cross-sectional view of the ends of two joined reinforced concrete piles with compatible joints interconnected according to the present invention.

Turning now to FIG. 3, shown therein is a schematic drawing of a partial cross-sectional view of the ends of two joined reinforced concrete piles 1a, 1b (i.e., a splice) with the compatible joints 2a, 2b interconnected according to the present invention using two locking pins 10b in their final inserted position. The lengths of the two locking pins 10b is selected so as to ensure that both can be driven into the final positions shown while preventing the other pin from being dislodged. This can be accomplished if the total lengths of the two pins is less than the combined length of the peripheral locator tubes 8a and the transverse locator tube 9a FIG. 3 also shows that any variation in the thickness tolerances of the end plates 3a, 3b does not affect the tensioning of the splice. The splice is designed so that the end plates 3a, 3b only serve as a locator for the lock socket 7a and lock rod 5b. Additionally, FIG. 3 shows that the lock rod 5b has a conical head 5c.

Figure 4:
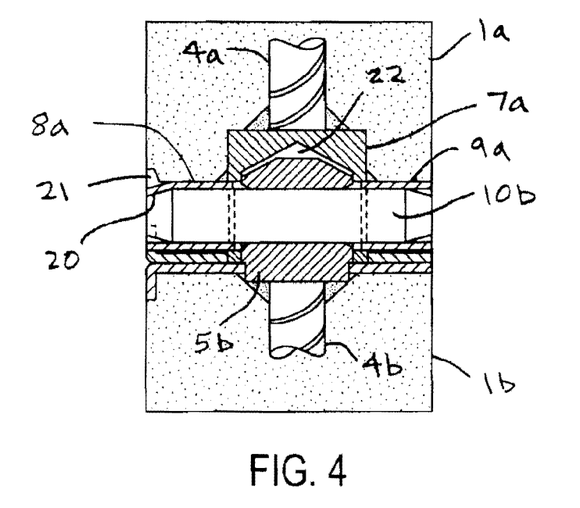
FIG. 4 is a another schematic drawing showing a partial cross-sectional view of the ends of two joined reinforced concrete piles with compatible joints interconnected according to the present invention.

FIG. 4 is a schematic drawing of a partial cross-sectional view of the ends of two joined reinforced concrete piles 1a, 1b with compatible joints 2a, 2b interconnected according to the present invention using the locking pin 10b secured by bending the wall 20 of the peripheral locator tube 8a in order to prevent the locking pin 10b from being dislodged. The wall 20 of the peripheral locator tube 8a is inserted into position using a suitable tool (e.g., hammer) by making use of the groove 21 when the piles 1a, 1b are spliced. FIG. 4 shows that the lock socket 7a includes a cavity 22 of a size that accepts the lock rod 5b. Additionally, FIG. 4 shows that the lock socket 7a can also be made of a tube with the required crosswise hole for connecting or fixing the peripheral locator tube 8a and the transverse locator tube 9a.

Figure 5:
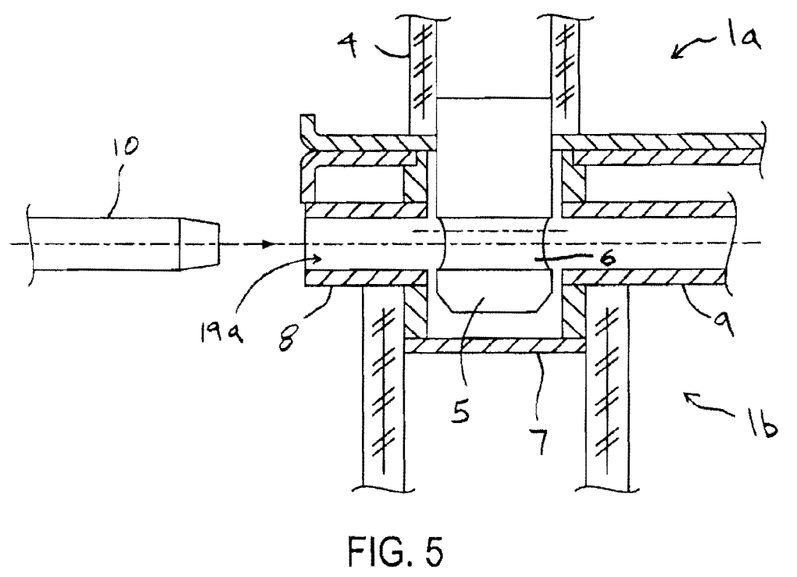
FIG. 5 is a schematic drawing showing a lateral cross-sectional view of the vertical section of the joints between two reinforced concrete piles in accordance with another embodiment of the present invention.

Turning now to FIG. 5, shown therein is a schematic drawing of a lateral cross-sectional view of the vertical section of the joints 2a, 2b between two reinforced concrete piles 1a, 1b in accordance with a another embodiment of the present invention, in which the lock rod 5a is positioned in the lock socket 7b of the concrete pile 1b such that the crosswise hole 6a of the lock rod 5a, and the crosswise tunnel 19a extending through the lock socket 7b, have an eccentric disposition relative to each other.

Figure 6:
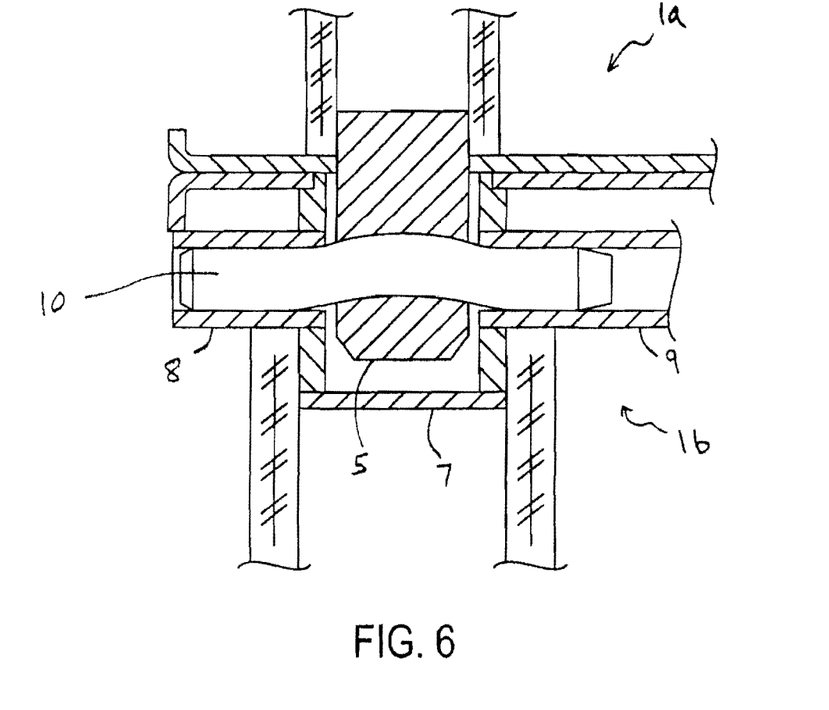
FIG. 6 is a schematic drawing showing a vertical cross-section of the joints in FIG. 5 after they are interconnected.

FIG. 6 is a schematic drawing of a vertical cross-section of the joints 2a, 2b in FIG. 5 interconnected such that the locking pin 10 is driven through the crosswise tunnel 19a of the transverse locator tube 9a that extends through the lock socket 7b and the crosswise hole 6b of the lock rod 5a. The locking pin 10 is preferably made from a more malleable steel than the components into which it is inserted. The eccentricity of the through-openings causes the more malleable locking pin 10 to cold-form and deflect as shown (exaggerated for emphasis) a few hundredths of an inch or more. The shouldered or tapered end of the pin facilitates entry into the transverse locator tube 9 even as the pin is being deflected upward as it traverses through the crosswise hole 6 of the lock rod 5. Because of the deflection in the locking pin 10 in the splice, the concrete piles 1a, 1b are pre-tensioned, making the splice very strong and resistant to lateral and longitudinal movement of the spliced pile sections.

Figure 7:
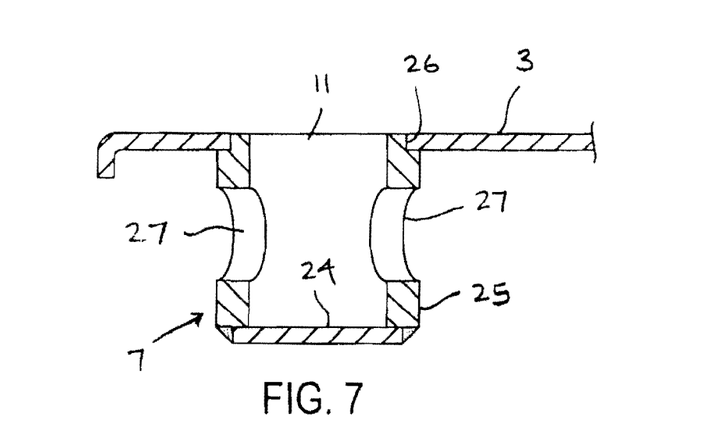
FIG. 7 is a schematic drawing showing a partial cross-section of one part of the joint according to the present invention.

FIG. 7 is a schematic drawing of a partial cross-section of one part of the joint 2b according to the present invention. The structure of the lock socket 7 of the reinforced concrete pile 1b consists of the sleeve 25 and is attached to the hole 11 in the end plate 3. Preferably, use is made of the piece 24 detached from the end plate 3 for making the hole 11 by welding it to serve as a base for the lock socket 7 A peripheral notch 26 is provided in the side of the sleeve 25, forming a shoulder and making it possible to position the sleeve 25 in the hole 11 accurately flush with the surface of the end plate 3. This ensures that the holes 27 of the sleeve 25 are positioned with great accuracy to achieve the preferred eccentricity of the various through-openings described above.

Figure 8:
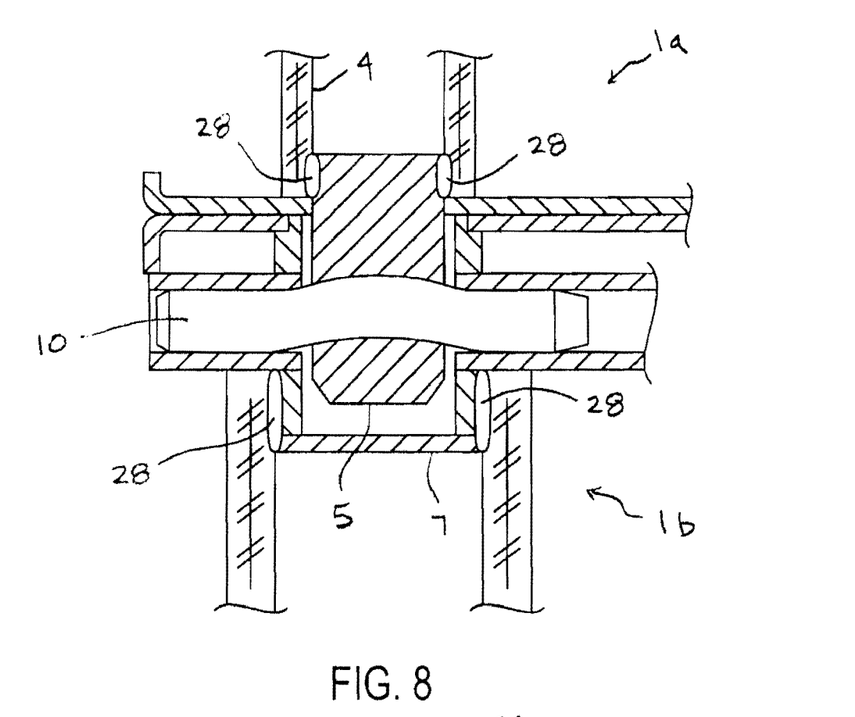
FIG. 8 is a schematic drawing showing a partial vertical cross-section of the reinforced concrete pile splice accordance to another embodiment of the present invention.

FIG. 8 is a schematic drawing of a partial vertical cross-section of the concrete pile splice accordance to another embodiment of the present invention in which the splicing method involves anchoring devices 4 (rebar, in this case) welded, from the side, with welds 28 to the structures of the joints 2a, 2b (FIG. 1). The welds 28 ensure a strong bond for the anchoring devices 4a, 4b. There may be one, two, three, etc., rebars per socket; it is the overall cross sectional amount of steel as compared to the pile that is the important consideration is determining the number of rebars.

Figure 9:
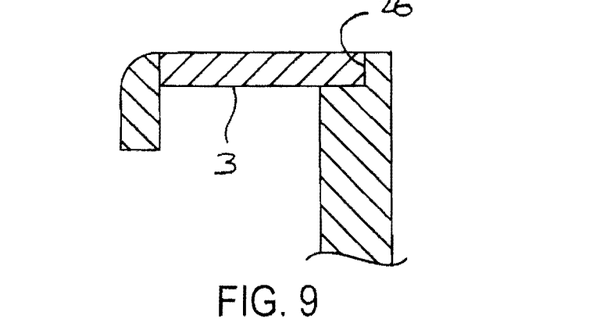
FIG. 9 is a schematic drawing showing a cross-section of one part of the joint according to the present invention.

FIG. 9 is a schematic drawing of a cross-section of one part of the joint 1a according to the present invention, in which the notch 26 is provided in the end plate 3a to prevent the water contained in the concrete from leaking into interior spaces within the joint 2a, causing potential damage.

Figure 10:
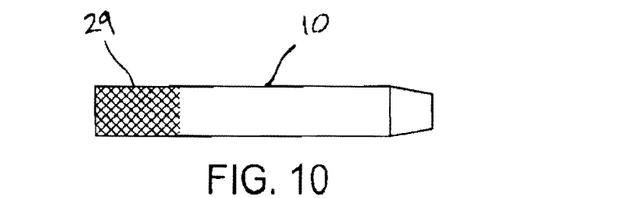
FIG. 10 is a schematic drawing showing a lateral view of one embodiment of a pin according to a preferred embodiment of the present invention.

FIG. 10 is a schematic drawing of a lateral view of one embodiment of a locking pin 10 according to the present invention. The locking pin 10 may have a textured surface 29 provided at the surface (or part of the surface) of the locking pin 10 to further enhance the retention of the locking pin 10 when it is inserted.

Figure 11:
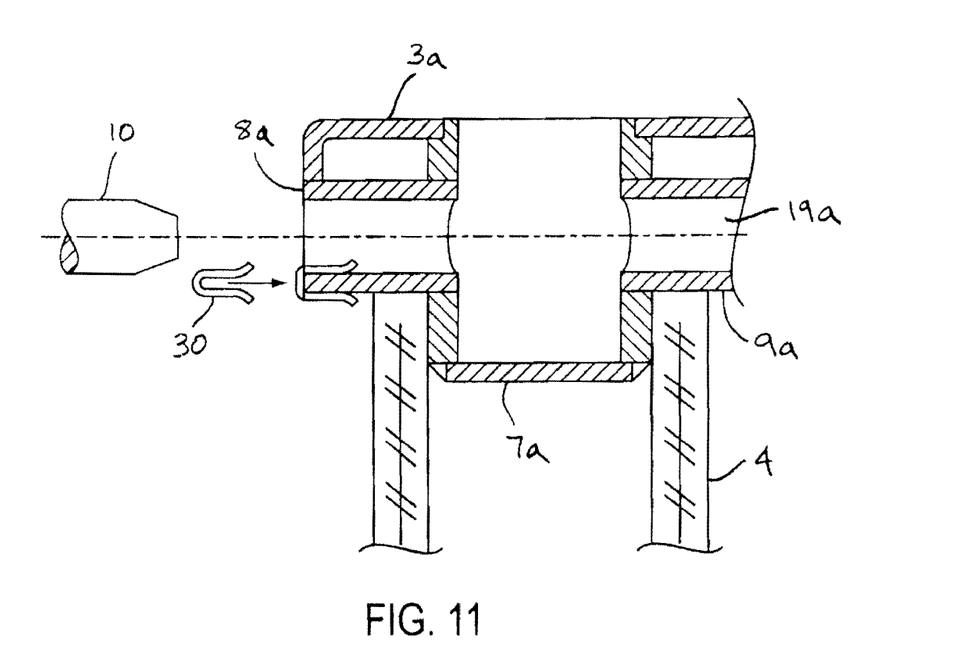
FIG. 11 is a another schematic drawing showing a partial cross-sectional lateral view of the joint according to the present invention.

FIG. 11 is a schematic drawing of a partial cross-sectional lateral view of a splice according to the present invention, in which a retaining spring 30 is provided at the edge of the peripheral locator tube 8a and partially inside the crosswise tunnel 19a extending through the lock socket 7a to further improve the retention of the locking pin 10 when it is inserted.

Figure 12:
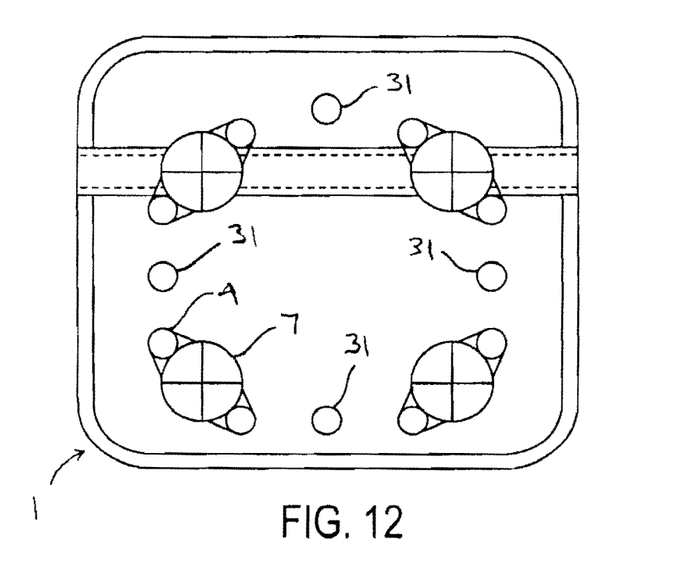
FIG. 12 is a schematic drawing showing a section of a reinforced concrete pile at the joint end according to the present invention.

FIG. 12 is a schematic drawing of a section of a concrete pile 1a at the joint 2a according to the present invention, looking at the side of the joint 2a that is in contact with the end of the reinforced concrete pile. As shown in the figure, cable through-holes 31 are provided on the end plate 3a for accepting pre-tensioning or pre-stressing cables 47 (as best seen in FIG. 14) that run through the length of the concrete piles.

Figure 13:
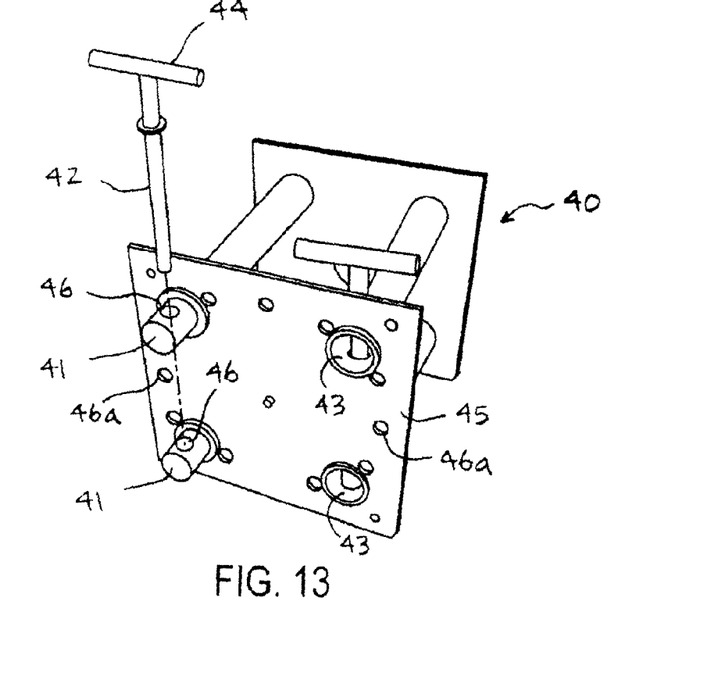
FIG. 13 is a schematic drawing showing a perspective view of a casting guide according to another embodiment of the present invention.

FIG. 13 is a schematic drawing of a perspective view of a casting guide 40 according to another embodiment of the present invention. The casting guide 40 includes two lock socket forms 41 extending in one direction from the casting guide plate 45, and two lock rod forms 43 extending in the opposite direction from the casting guide plate 45. The two lock socket forms 41 include axially-aligned through-holes 46 into which a casting guide pin 42 is inserted to pin the joint (not shown) at four corners. Also shown are a plurality of cable through-holes 46a, some of which correspond to the through-holes 31 on the end plate 3a. At least the bottom two corners of the casting guide plate 45 are preferably rounded.

FIG. 14 is a schematic drawing showing a perspective view of the casting guide 40 of FIG. 13 positioned inside a casting chute 50 according to the present invention along with joints 2a, 2b as previously described. During manufacture of the piles 1a, 1b, the end plates 3a, 3b may be positioned inside and attached to the casting chute 50 at all four corners of the joints 2a, 2b during casting of the concrete piles 1a, 1b, using the casting guide 40. The use of the casting guide pin 42 to align the casting guide plate 45 and also reach the bottom corners of the joints 2a, 2b during casting to allow pinning at four corners is a more secure and reliable means of attaching compared to attaching at less than four points. This technique allows one to manufacture every joint 2a, 2b to the same tolerance.

Figure 15:
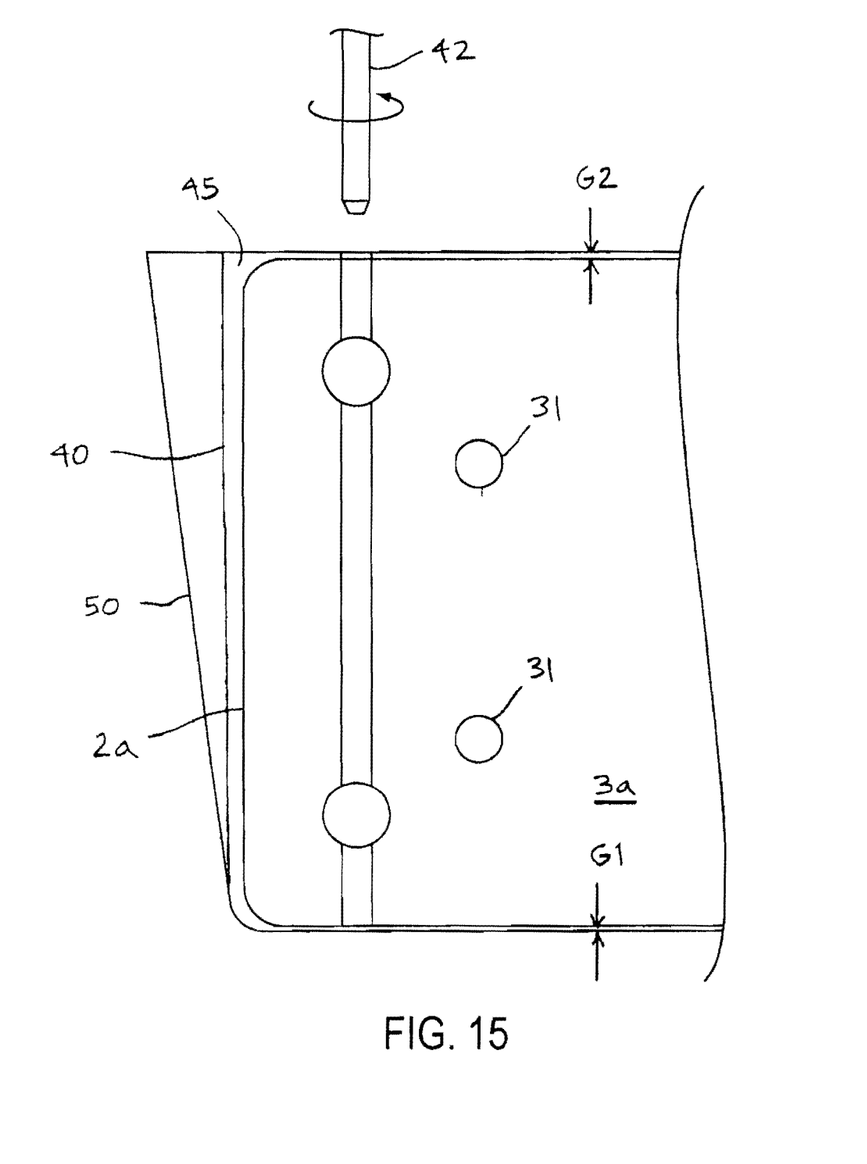
FIG. 15 is a schematic drawing showing a vertical partial cross-sectional elevation view of the casting guide, joint, and casting chute of FIG. 14 according to the present invention.

FIG. 15 is a schematic drawing showing a vertical partial cross-sectional elevation view of the casting guide 40 and the joint 2a according to the present invention in their respective positions in the casting chute 50. The end plate 3a of the joint 2a is shown securely attached next to the casting guide plate 45 so that the end plate 3a nearly touches the bottom of the casting chute 50. While the bottom edge of the casting guide plate 45 may rest upon the bottom of the casting chute 50 when the concrete is poured, it is preferred that the end plate 3a be above the bottom of the casting chute 50 by about one-eighth of an inch or so, as shown by G1. Similarly, the top of the end plate 3a is slightly below the top of the casting guide plate 45 and the top of the casting chute 50 by about one-sixteenth or one-eighth of an inch or so, as shown by G2. The casting guide holes should match the holes on the end plate 3a. The face of the casting guide 40 should basically match the cross-sectional shape of the casting chute, which can vary along its length. Generally, the face of the casting guide 40 has tapered or chamfered walls with rounded corners at the bottom.

FIG. 15 also shows the preferred trapezoidal cross-sectional shape of the casting chute 50, which provides a space at the top of the mold to allow the finished concrete pile 1a to be easily slid out of the casting chute 50.

FIG. 15 further shows two of several cable through-holes 31 which allow for the pre-tensioned or pre-stress cables to pass through the end plate 3a and the casting guide plate 45.

Figure 16A:
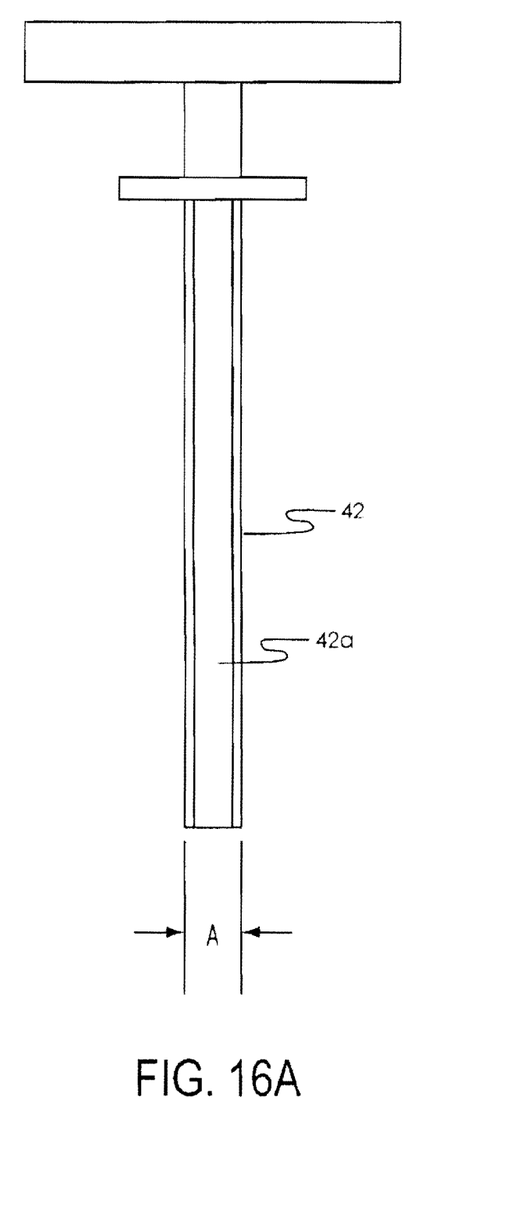
FIGS. 16a and 16b are schematic drawings showing a vertical elevation view of the casting guide pin according to one embodiment of the invention.
Figure 16B:
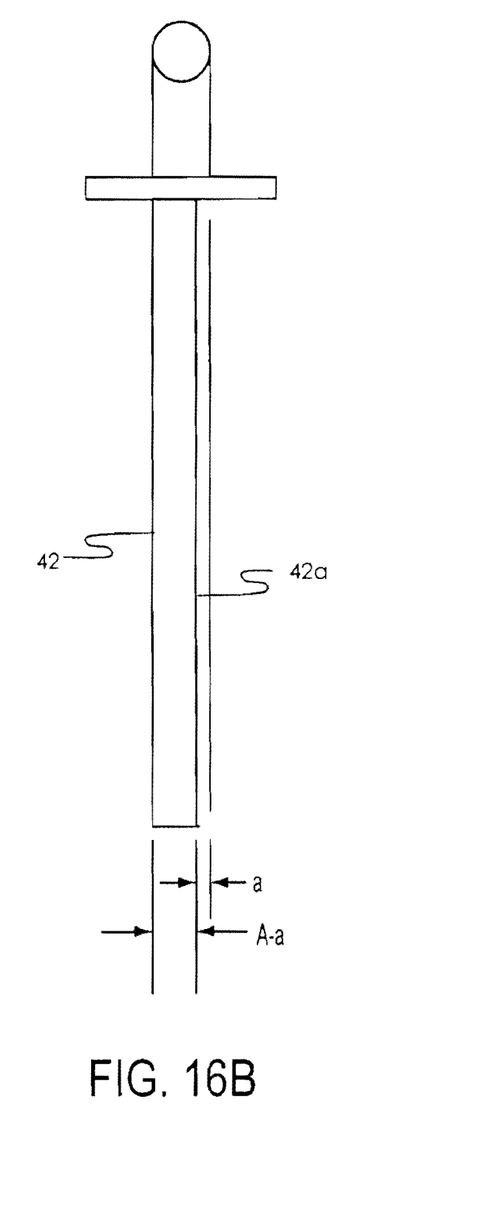

FIGS. 16a and 16b are schematic drawings showing vertical front and side elevation views, respectively, of the casting guide pin 42 according to one embodiment of the invention. The casting guide pin 42 is preferably cylindrical-shaped with one side milled flat to form a flat face 42a. The dimension A exists in the lateral direction. The dimension A-a shows the extent to which the side of the casting guide pin 42 has been milled flat relative to its original size to form the flat face 42a.

The shape of the casting guide pin 42 is such that it easily passes through the male-female overlap region where the eccentricity exists between of the through-openings (as best seen in FIG. 6). During casting, there may be four casting guide pins 42 at each joint, two on each side of the casting guide, holding, respectively, two joints. Once inserted, the casting guide pin 42 is rotated, as illustrated in FIG. 15, to securely lock the casting guide plate 45 and end plate 3a together before the concrete pour. Because the casting guide pin 42 reaches across the end plate 3a, only two casting guide pins 42 are needed for each joint 2a, as described above. Among other things, this arrangement improves the longitudinal alignment of components during casting.

The sides and bottom of the casting chute 50 and the casting guide plates 45 are oiled prior to use. The casting guide 40 is positioned in an arbitrary location inside the casting chute 50 with the two rounded corners on the bottom of the casting chute 50. The location of the casting guide 40 is selected based on a desired length of the pile sections 1a, 1b. The joint 2a is attached to one side of the casting guide 40, and the joint 2b is attached to the other side of the casting guide 40. The casting guide pins 42 are inserted to lock the joints 2a, 2b to the casting guide 40 by turning the casting guide pins 42 by hand. When the casting guide pin 42 is turned, the pin approaches the dimension A in the longitudinal direction of the pile 1a, and held in that position by friction. This presses the joints 2a, 2b against their respective sides of the casting guide 40.

Next, the pre-stressing cables 47 are pulled through the cable through-holes on the casting guide 40 and the cable through-holes 31 on the end plates 3a, 3b and attached at their respective ends to a hydraulic press which anchors and positions the cables inside the casting chute 50. A suitable load-locking fastener (not shown) may be attached to the cables where they pass between the two casting guide plates 45 to prevent unwanted movement.

Next, ductility or spiral wire 48 is pulled up and secured at the proper spacing to satisfy code requirements. Once the joints 1a, 1b, casting guide 40, rebar, pre-stressing cables 47, and spiral wire 48 are in place, the concrete is poured, vibrated to remove air and to ensure a firm attachment of the joints 2a, 2b to the respective ends of the piles 1a, 1b. The exposed top of the concrete is finished, and then the piles 1a, 1b are allowed to cure inside the casting chute 50. Once the concrete is cured, the pre-stressing cables may be cut inside the casting guide 40, and any remaining cable material may be grinded down to the level of the end plates 3a, 3b.

Before installing the piles 1a, 1b, the protective caps 16, 17 should be removed, which were installed after the piles 1a, 1b had cured to prevent dirt and concrete from plugging the openings, and to prevent water from entering the locking components of the joints 2a, 2b and freezing. A driving plate (not shown) is placed over the joint 2a so that the driving rig does not damage the joint 2a during hammering. Once the pile 1a has been hammered into place, but with about four feet extending above the its final position, the mating pile 1b is lowered so that the joint 2b is parallel with the joint 2a and the respective lock rods 5a, 5b align with the lock sockets 7a, 7b. Four locking pins 10 are then driven into place using a hammer or sledge, each pin inserted into its own peripheral locator tube 8.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A method of making a concrete pile, the method comprising:
   providing a casting chute, the casting chute comprising two side members and an interior space between the two side members;
   providing a casting guide in the interior space of the casting chute, the casting guide comprising:
      a first casting guide end plate;
      a first plurality of spaced apart lock rod forms attached to the first casting guide end plate and extending substantially perpendicular to the casting guide end plate, at least two of the first plurality of lock rod forms comprising a first set of crosswise through-holes having an axis substantially parallel to the plane of the casting guide end plate and substantially co-axial to each other;
      a first plurality of spaced apart lock socket forms attached to the casting guide end plate and extending substantially perpendicular to the casting guide end plate in a substantially opposite direction from the first plurality of lock rod forms, at least two of the first plurality of lock socket forms comprising a second set of crosswise through-holes having an axis substantially parallel to the plane of the casting guide end plate and substantially co-axial to each other; and
      a second casting guide end plate attached to a second plurality of spaced apart lock rod forms and a second plurality of spaced apart lock socket forms,
   attaching a joint to the first casting guide end plate, the joint comprising a joint end plate, a plurality of spaced apart lock rods, and a plurality of spaced apart lock sockets;
   pinning the joint to the casting guide by inserting a first casting guide pin in the first set of crosswise through-holes and inserting a second casting guide pin in the second set of crosswise through-holes, the first and second casting guide pin extending substantially across the first casting guide end plate; and
   pouring concrete into the interior space of the casting chute.

2. The method of claim 1, wherein the first casting guide end plate is configured such that the joint end plate is positioned above a bottom of the interior space of the casting chute while the casting guide rests on the bottom of the interior space.

3. The method of claim 1, wherein the first casting guide plate is configured such that a top of the joint end plate is below atop of the first casting guide plate and a top of the casting chute while the casting guide rests on the bottom of the interior space.

4. The method of claim 1, further comprising:
attaching a second joint to the second casting guide end plate.

5. The method of claim 4, further comprising:
inserting a third casting guide pin in a third set of crosswise through-holes in the second plurality of spaced apart lock rod forms; and
inserting a fourth casting guide pin in a fourth set of crosswise through-holes in the second plurality of spaced apart lock socket forms.

6. The method of claim 1, wherein the first casting guide end plate and the joint end plate each comprise a plurality of through-holes, the method further comprising:
inserting a plurality of pre-stress cables through the plurality of through-holes of the joint end plate and the first casting guide plate end plate.

7. The method of claim 6, further comprising:
attaching ends of the plurality of pre-stress cables to one or more hydraulic presses to hold the pre-stress cables inside the interior space of the casting chute.

8. The method of claim 7, further comprising:
fastening the plurality of pre-stress cables to the casting guide.

9. The method of claim 1, further comprising:
attaching spiral wire to the joint end plate.

10. The method of claim 1, wherein the first and second casting guide pins are substantially cylindrical-shaped with one flat side.

11. The method of claim 1, wherein a cross-sectional shape of the casting chute is trapezoidal.

12. The method of claim 1, wherein a cross-sectional shape of the interior space of the casting chute is substantially similar to a cross-sectional shape of the first casting guide end plate.

13. The method of claim 12, wherein the cross-sectional shape of the interior space comprises two rounded corners.

14. The method of claim 1, wherein at least two corners of the first casting guide plate are rounded.

* * * * *